United States Patent [19]

Engstrom et al.

[11] 4,415,349
[45] Nov. 15, 1983

[54] METHOD AND APPARATUS FOR COOLING GLASS FURNACE FOREHEARTH

[75] Inventors: John H. Engstrom; Robert W. Ellis, both of Vineland, N.J.

[73] Assignee: Owens-Illinois, Inc., Toledo, Ohio

[21] Appl. No.: 368,605

[22] Filed: Apr. 15, 1982

[51] Int. Cl.³ .............................................. C03B 5/23
[52] U.S. Cl. ...................................... 65/137; 65/337; 65/346; 65/356
[58] Field of Search ................... 65/137, 337, 346, 356

[56] References Cited

U.S. PATENT DOCUMENTS 2,282,554  5/1942  Barker, Jr. ..................... 65/137 X
3,206,295  9/1965  Mattern ........................... 65/346 X
4,352,687  10/1982  Boettner .......................... 65/346 X Primary Examiner—Arthur D. Kellogg
Attorney, Agent, or Firm—J. R. Nelson; M. E. Click

[57] ABSTRACT

An apparatus and method is disclosed for cooling a molten stream of glass flowing in a firebrick hearth from an entrance end to an exit end of a glass furnace forehearth, the method comprising the steps of: cooling the bottom of the hearth which cools the molten glass by forcing air through ducts in the hearth bottom insulation; cooling each side of the hearth which cools the molten glass by forcing air through ducts along the side of the hearth.

7 Claims, 4 Drawing Figures

METHOD AND APPARATUS FOR COOLING GLASS FURNACE FOREHEARTH

THE INVENTION

The present invention is directed to apparatus and a method for cooling a molten stream of glass flowing in a firebrick hearth of a glass furnace forehearth the method including cooling the bottom of the hearths by forcing air through ducts in the hearth bottom insulation, the method also including cooling each side of the hearth by using forced air through ducts located in the insulation along the side of the hearth.

It is an object of the present invention to provide a method of cooling a molten stream of glass flowing in a firebrick hearth from an entrance end to an exit end of a glass furnace forehearth, the method comprising the steps of: cooling the bottom of the hearth which cools the molten glass by forcing air through ducts in the hearth bottom insulation; and cooling each side of the hearth which cools the molten glass by forcing air through ducts along the side of the hearth to provide a uniform vertical temperature gradient in the stream of molten glass.

It is an object of the present invention to provide a method of cooling a stream of molten glass flowing in a firebrick hearth from an entrance in to an exit end of a glass furnace forehearth, the method including cooling the top of the hearth, the bottom of the hearth, and the sides of the hearth to provide 360° of cooling around the hearth in the stream of molten glass to achieve a small vertical gradient in the neighborhood of about 15° F. maximum.

It is an object of the present invention to provide a glass furnace forehearth comprising a firebrick hearth that is generally rectangular in cross section and has a central interior cavity for cooling and fining molten glass as the glass travels within the cavity from the entrance to the exit of the forehearth, the central cavity being defined by generally parallel top and bottom interior wall surfaces and generally parallel side surfaces that are generally elliptical in shape, the forehearth comprising a furnace bottom below the hearth, a furnace sidewall located on each side of the hearth and spaced apart generally parallel along the longitudinal axis of the forehearth, a firebox located over the top of the hearth, there being means for forced cooling along the hearth sidewalls and hearth bottom as well as the top, the means for cooling including a plurality of air ducts spaced generally along the longitudinal axis of the forehearth, each air duct disposed generally in a direction perpendicular to the longitudinal axis of the forehearth the cooling means also including means for forcing air through the air ducts and there being provided means for heating and cooling the top of the hearth in the firebox to provide 360° of cooling around the molten glass stream.

These and other objects will be apparent from the specification that follows, the appended claims, and the drawings in which:

Figure 1:
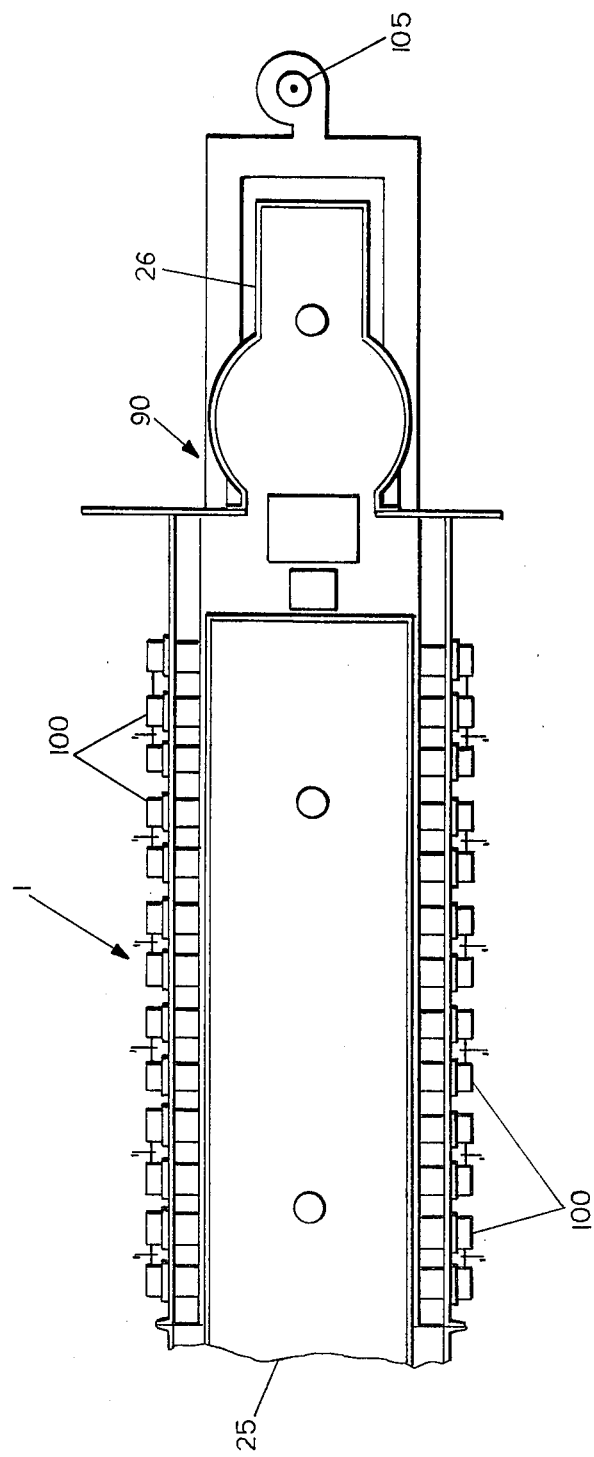
FIG. 1 is a top plan view of a glass furnace forehearth and forced cooling means for the hearth according to the present invention.
Figure 2:
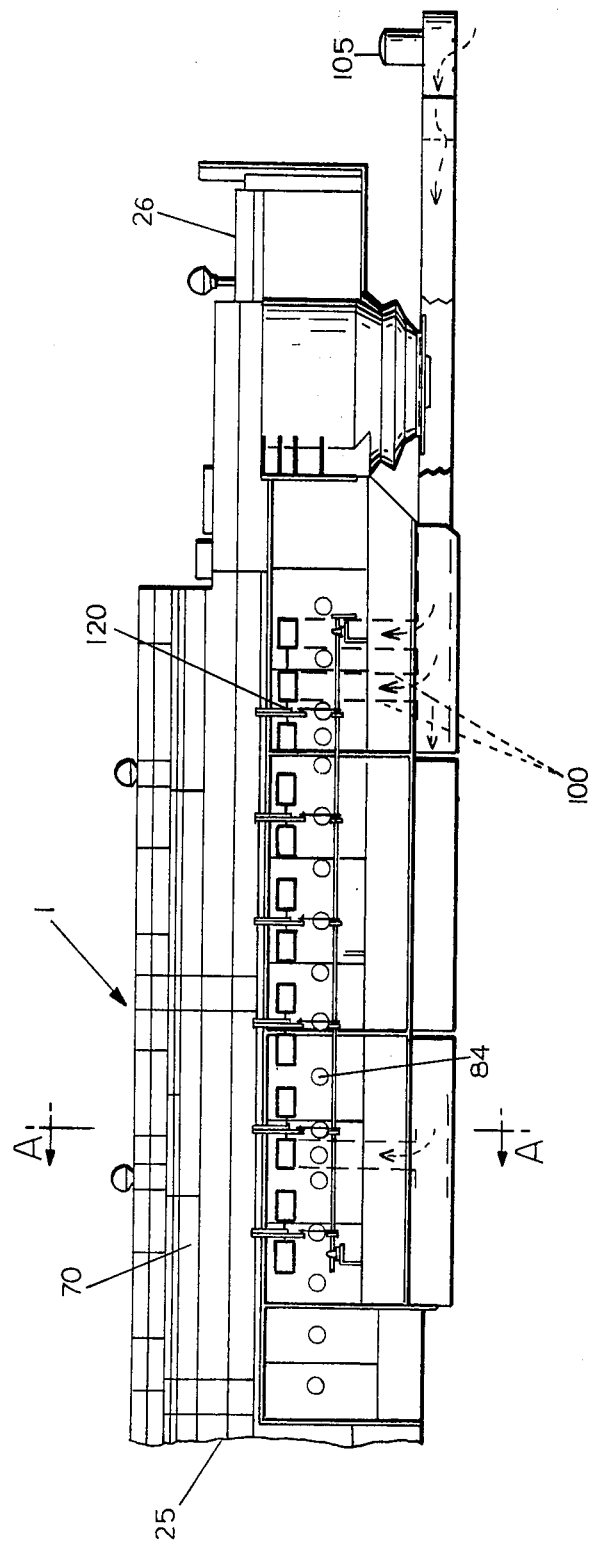
FIG. 2 is a side elevational view of the glass furnace forehearth.

The present invention provides a unique method of cooling the molten steeam of glass flowing in a hearth from an entrance end to an exit end of a glass furnace forehearth, the method comprising the steps of: cooling the bottom of the hearth which in turn cools the molten glass by forcing air through ducts in the hearth bottom insulation; and cooling each side of the hearth which in turn cools the molten glass by forcing air through ducts alongside of the hearth in the side insulation.

The present invention also provides an outstanding method of providing 360° of cooling around the hearth in the stream of molten glass the method including the further step of cooling the top of the hearth through the firebox to thereby provide a uniform cooling of the molten glass and a vertical gradient of not more than about 15° to 20° F.

The present invention also provides a glass furnace forehearth comprising a firebrick hearth that has a central interior cavity therein for cooling and fining the molten glass as the glass travels within the cavity from the entrance to the exit end of the forehearth, the central cavity being generally defined by parallel top and bottom interior wall surfaces and generally parallel side surfaces the side surfaces being generally elliptical in shape, the forehearth further comprising the furnace bottom below the hearth, a furnce sidewall located on each side of the hearth and spaced apart generally parallel along the longitudinal axis of the forehearth, the firebox located over the top of the hearth, there being insulation located between the bottom of the hearth and the bottom of the furnace, there being sidewall insulation located on each side of the hearth between the hearth side and the furnace sidewall, there being also provided cooling means for cooling the hearth sidewalls and hearth bottom including a plurality of air ducts located in the bottom insulation and the sidewall insulation, said air ducts being spaced generally along the longitudinal axis of the forehearth, each air duct being disposed generally in a direction parallel to the longitudinal axis of the forehearth, the cooling means also including means for forcing air through the air ducts, and there being provided means for heating and cooling the top of the hearth in the firebox to thereby provide for cooling on the top, bottom and both sides of the hearth. The novel glass furnace forehearth apparatus of the present invention provides for forced cooling on all sides of the molten stream of glass in the hearth to provide for a maximum vertical gradient in the molten glass of only about 20° to 25° F. and preferably only about 15° F.

Referring to the drawings, there is provided a glass furnace forehearth 1 that comprises a firebrick hearth 5 that is generally rectangular in cross section and has a central interior cavity 10 for cooling and fining molten glass 20 as the glass travels within the cavity from the entrance 25 to the exit 26 of the forehearth 1, the central cavity being defined by generally parallel top and bottom interior wall surfaces 30, 31 and generally parallel side surfaces 40, 41 that are generally hemispherical in shape.

As seen in the drawings, the forehearth comprises a furnace bottom member 50 below the hearth 5 and adjacent thereto, furnace sidewall member 60 and 61 located on each side of the hearth 5 and adjacent thereto. Also there are provided outer sidewalls 65 and 66 spaced apart generally parallel along the longitudinal axis of the forehearth. An outer furnace bottom 68 is located beneath the hearth 5 and beneath the bottom member 50. The forehearth has a firebox 70 with heating or cooling ports 72 located over the top of the hearth, there being insulation 75 located between the bottom of the hearth and the bottom of the furnace, there also being sidewall insulation 80, 81 located on each side of the hearth between the hearth side and the furnace sidewall. A plurality of electrodes 83, 84 are located on each side of the furnace wall, an electrode located between each air duct.

As also seen in the drawings, there is provided cooling means 90 for cooling the hearth sidewalls and hearth bottom including a plurality of air ducts 100 located in the bottom insulation and the sidewall insulation. The air ducts are spaced generally along a longitudinal axis of the forehearth there being preferably two or more and optimally five such ducts equally spaced (preferably every 4 ft. section) in a direction perpendicular to the longitudinal axis of the forehearth. There is provided cooling means including blower means 105 for forcing air through the air ducts. Thus there is provided also means 110 for heating and cooling the top of the hearth in the firebox to therefore provide for 360° cooling on the top, bottom, and both sides of the hearth.

As further seen in the drawings, there is provided control means 120 controlling the flow rate of the air in the ducts. It can be seen that the total area of the bottom air ducts in the bottom insulation compared to the area of the hearth that cools is at least about 30% and preferably 40% of the area of the hearth bottom being cooled. Likewise the total area of the sides of the air ducts in the sidewall insulation that is adjacent its corresponding hearth sidewall is at least about 30% of the area of the adjacent hearth sidewall being cooled and preferably about 40 to 50% of such area.

Figure 3:
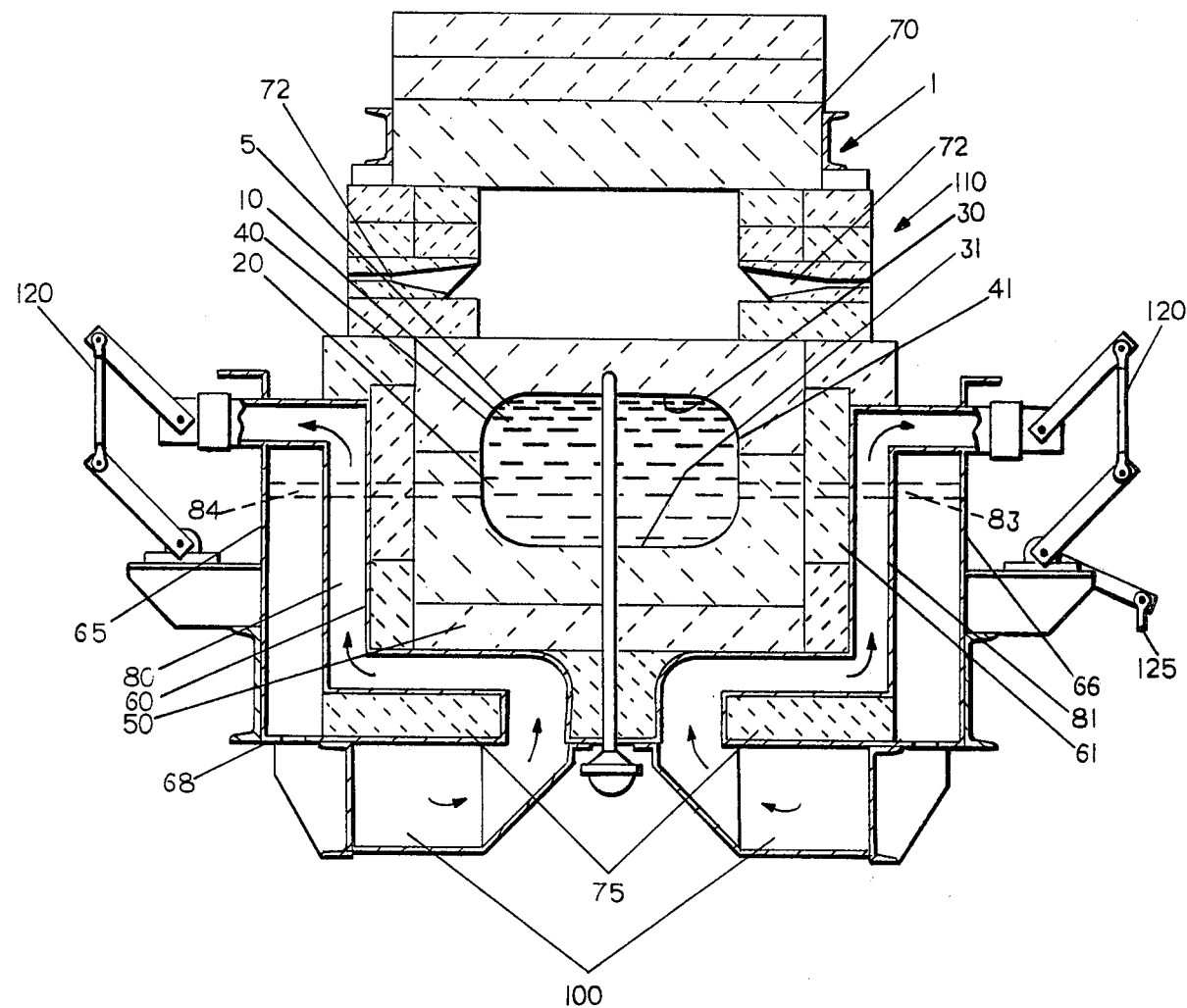
FIG. 3 is cross sectional view of the glass forehearth taken along the lines A—A of FIG. 2 and showing the novel air ducts in the side insulation and the bottom insulation for the hearth.
Figure 4:
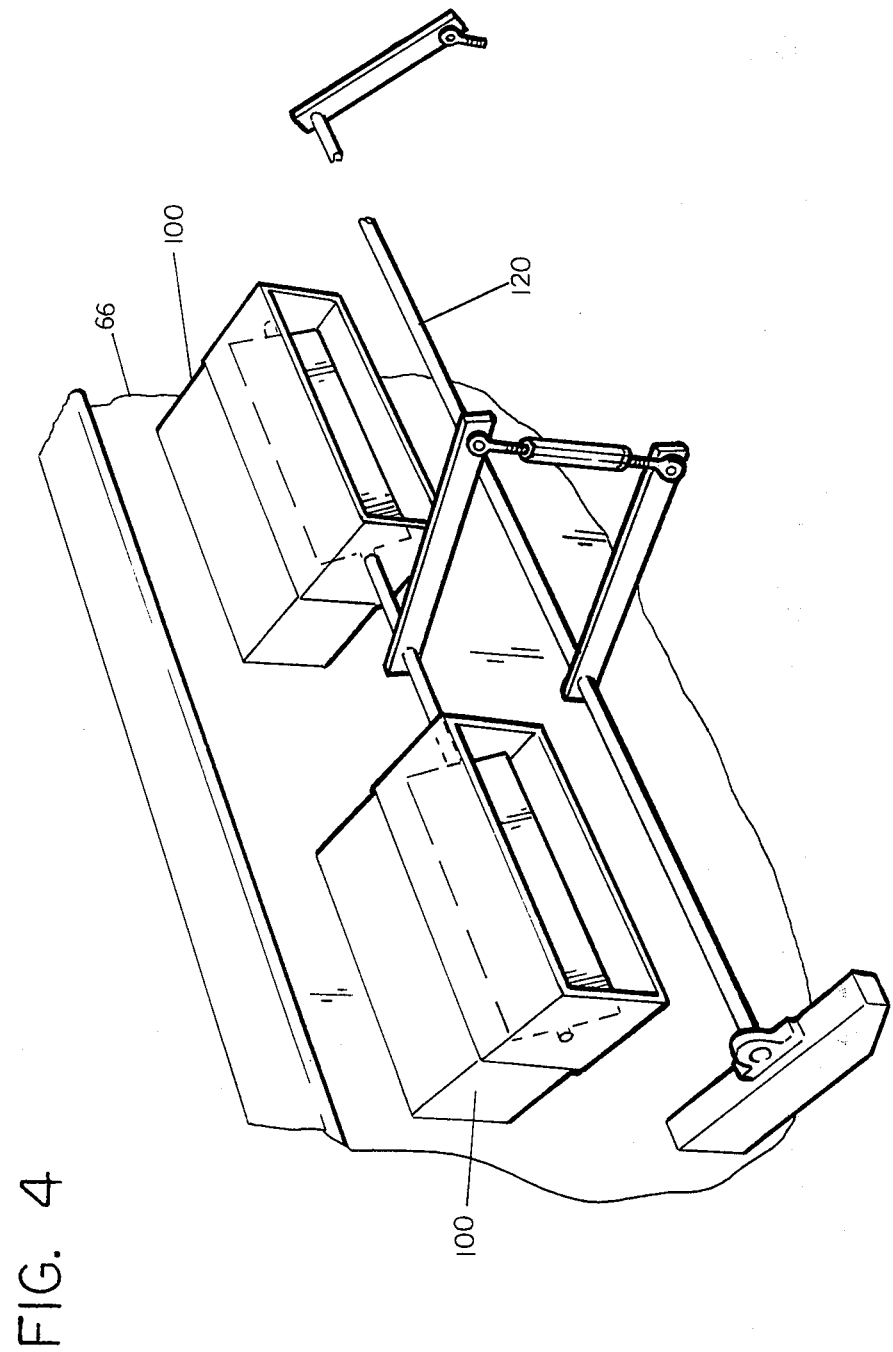
FIG. 4 is a perspective view on an enlarged scale showing the damper means for controlling the air flow in the air ducts.

The control means 120, as for instance seen in FIGS. 3 and 4 includes damper means for the air ducts comprising a damper E that pivots and swings from connecting member D. The opening and closing of the damper can be accomplished by suitable means such as by linkages A, B, F, and G and crossbar C.

Up and down movement of the control member 125 is translated thru the linkages to the pivotal movement of the damper E around the connecting member D to control the amount of air forced through the ducts 400.

The firebox can be provided with heating means such as ports 72 for burners not shown as is well known in the art such as Cannon U.S. Pat. No. 2,582,477. The Cannon patent shows a firebox with burner parts in burner blocks. It also shows cooling of the refracting channel joints but only at the joint with an air channel using natural draft as opposed to cooling the entire length of the central forehearth cavity using forced air in ducts in the side and bottom insulation in the present invention.

A firebox for a forehearth with firebox heating and cooling means is shown in Winzer et al. U.S. Pat. No. 4,294,603 and Honiss U.S. Pat. No. 2,735,229.

None of the above patents show 360° cooling around the molten glass stream so as to provide a uniform temperature of only a maximum vertical gradient of about 15° F.

What is claimed is:

1. A glass furnace forehearth comprising a firebrick hearth that is generally rectangular in cross section and has a central interior cavity for cooling and fining molten glass as the glass travels within the cavity from the entrance to the exit of the forehearth, the central cavity being defined by generally parallel top and bottom interior wall surfces and generally parallel side surfaces that are generally elliptical in shape, the forehearth comprising a furnace bottom below the hearth, a furnace sidewall located on each side of the hearth and spaced apart generally parallel along the longitudinal axis of the forehearth, a firebox located over the top of the hearth, insulation located between the bottom of the hearth and the bottom of the furnace, sidewall insulation located on each side of the hearth betweenthe hearth side and the furnce sidewall, there being provided cooling means for cooling the hearth sidewalls and hearth bottom including a plurality of air ducts located in the bottom insulation and the sidewall insulation, the air ducts being spaced generally along the longitudinal axis of the forehearth, each air duct disposed generally in a direction perpendicular to the longitudinal axis of the forehearth, each duct being so constructed and arranged that it has a contacting side that contacts its adjacent associated forehearth bottom and the adjacent sidewall substantially the length of the contacting side, the area of the contacting sides being at least about 30% of the area of the forehearth bottom and the sidewalls, the cooling means including means for forcing air through the air ducts, and there being provided means for heating and cooling the top of the hearth in the firebox to thereby provide for cooling on the top, bottom and both sides of the hearth.

2. A forehearth as defined in claim 1 in which there is provided blower means for forcing air through the air ducts and means for conrolling the flow rate of the air in the ducts.

3. A forehearth as defined in claim 2 in which the maximum vertical gradient in the molten glass is no more than about 15° F.

4. A forehearth as defined in claim 1 in which the total area of the bottom air ducts in the bottom insulation is more than about 40% of the area of the hearth bottom.

5. A forehearth as defined in claim 1 in which the total area of the sides of the air ducts in the sidewall insulation that is adjacent its corresponding hearth sidewall is more than about 40% of the area of the adjacent hearth sidewall, there being about five air ducts spaced along the longitudinal axis of the forehearth.

6. A method of cooling a molten stream of glass flowing in a firebrick hearth from an entrance end to an exit end of a glass furnace forehearth, the method comprising the steps of: providing an air duct adjacent the forehearth bottom having contacting sides that contact the bottom over at least about 30% of the area of the bottom; cooling the bottom of the hearth which cools the molten glass by forcing air through the ducts in the hearth bottom insulation; providing contacting sides of air ducts that contact the forehearth sidewalls over at least about 30% of their area; cooling each side of the hearth which cools the molten glass by forcing air through the ducts along the side of the hearth.

7. A method as defined in claim 6 in which the method includes cooling the top of the hearth to thereby provide 360° of cooling around the hearth and the stream of molten glass.

* * * * *